United States Patent [19]

Ignasiak

[11] 4,071,640
[45] Jan. 31, 1978

[54] PENETRATION PHOSPHORS FOR DISPLAY DEVICES

[75] Inventor: Stanley F. Ignasiak, Holliston, Mass.

[73] Assignee: Sperry Rand Corporation, New York, N.Y.

[21] Appl. No.: 669,426

[22] Filed: Mar. 22, 1976

[51] Int. Cl.² .................. C09K 11/14; C09K 11/46
[52] U.S. Cl. ..................... 427/215; 427/68; 252/301.4 R; 252/301.4 S; 428/403
[58] Field of Search ................. 427/215, 68; 428/402, 428/403, 404, 330, 322; 252/301.4; 96/34

[56] References Cited

U.S. PATENT DOCUMENTS

| 3,560,783 | 2/1971 | Shortes | 313/92 |
| 3,767,459 | 10/1973 | Kingsley et al. | 252/301.65 |
| 3,791,844 | 2/1974 | Tecotzky et al. | 427/215 X |
| 3,939,377 | 2/1976 | Ignasiak | 427/215 X |

Primary Examiner—Ralph S. Kendall
Attorney, Agent, or Firm—Howard P. Terry

[57] ABSTRACT $La_2O_2S$ particles are employed as a carrier host in conjunction with terbium activator ions in a cathodoluminescent penetration phosphor composition for cathode ray display tubes. A thin layer of $La_2O_2SO_4$:Tb or $La_2O_2SO_4$:Tb,Eu is utilized to provide a barrier which must be penetrated by excitation electrons to produce green spectral emission from the particle thereby increasing the voltage-turn-on characteristic of the phosphor. Additionally, methods are disclosed for synthesizing the same in addition to an improved method for synthesizing a penetration phosphor particle comprising a core of $La_2O_2S$:Tb and a barrier layer of $La_2O_2S$:Tb,Eu.

14 Claims, 7 Drawing Figures

PENETRATION PHOSPHORS FOR DISPLAY DEVICES

BACKGROUND OF THE INVENTION

1. Field of the Invention

The invention pertains generally to the field of cathode-luminescent phosphor materials and to cathode ray displays employing them and more particularly concerns improved penetration phosphors for use in bright color display cathode ray indicators.

2. Description of the Prior Art

In Applicant's copending application Ser. No. 505,710, now U.S. Pat. No. 3,939,377, entitled "Penetration Phosphors and Display Devices", and assigned to the assignee of the present invention, Applicant points out the particular requirements of cathode ray vacuum tubes for use in information displays such as air traffic control, radar, data processing and the like. In particular, Applicant points out that the particular requirements for such systems are generally not met by cathode ray tubes of the type conventionally available for color television viewing. For example, these particular systems generally do not require the many colors needed for a television screen; for example, the provision of blue may even be undesirable. While red and green are readily simultaneously focussed by the optics of the normal eye at the sensitive high resolution fovea, the blue component of the image is normally out of focus and its presence may even tire the eye. Further, the very center of the fovea is red and green sensitive, but blue is not appreciably sensed there. Since red and green light may purposely be mixed so as to yield the sensations of orange or of yellow in the eye, a wide range of colors adequate for information displays is available without the use of blue.

Further features are desirable in an information display; a major need is to provide brightness and contrast when the display is viewed in a high ambient light level, including sun light, whereas conventional color cathode ray television tubes are useful only at low or medium light levels. High resolution, especially in the center of the screen, not available in conventional tubes, is also desired. Relatively simple electron beam focussing and scanning elements are also desired so that either raster scanning or random beam positioning or both, as often required for presenting computer information, is easily achieved.

While several kinds of color television cathode ray tubes are currently available, including the older type with a mask with round holes, the in-line, slot-mask color tube, and the recent slit mask color tube, all of these use multiple guns and complex electron beam focussing and scanning arrangements and are generally not suited for use in information displays, especially where random deflection is needed. Resolution is poor, and sensitivity to stray and earth's magnetic fields is undesirably high. Because they require multiple cathode and multiple electrode systems, sensitivity to shock and to vibration is also excessive.

While originally conceived for use in color television receiver displays, the penetration phosphor color tube and the principles it employs offer several advantages for use in information displays. The penetration phosphor color display of the present invention overcomes the defects of prior art color displays, again permitting much more information to be displayed effectively simultaneously than by a black and white tube. Additionally, recognition of individual data representations in the displayed material when colored is much more rapid than in a monochromatic or black and white display.

The conventional penetration phosphor cathode ray tube in its most prevalent form has a viewing screen which uses controlled penetration of electrons into a series of phosphor layers for producing therein light of a corresponding series of colors. For example, the screen may include two different phosphor layers, each very thin and uniform, and separated by a transparent dielectric layer. When the electron beam is driven by a relatively low voltage, the energy of the electrons is not sufficient to penetrate the dielectric barrier layer; only the phosphor of the first layer is excited and only its corresponding color is produced. At higher electron beam voltages and correspondingly higher electron energies, the phosphors of both layers are excited; the intensity of the color contribution by the second layer phosphor increases as the electron beam energy is increased.

Full use may be made of the penetration phosphor characteristics in providing a variable color display while using only one electron beam simply by controlling the voltage on the beam acceleration electrode adjacent the cathode. With red and green emitting phosphors, successive changes in the beam acceleration voltage generate distinct colors; for example, red, orange, yellow, or green may thus be generated. Only one suitably controlled electron gun is required and the apertured masks of prior art color television tubes are eliminated along with other features undesirable for use in information displays.

The prior art provides penetration phosphor display tubes which appear to fall into one of four categories, the principal of these being the aforementioned multilayer type in which several alternating layers of phosphors and dielectric barrier layers are placed on the screen of the tube by sedimentation. Very thin uniform layers are required for use with conveniently low acceleration voltages and they are difficult to form because of the many steps involved and of the close tolerances to be held on layer thicknesses. It has also been proposed to coat one or more layers of very small phosphor particles on larger phosphor particles emitting a different light color, the composite particles being built up using gelatin to hold them together. Thus, each particle is a multi-layered structure and may include alternated barrier layers. Particle size is a serious problem since the greater the number of layers added, the greater becomes particle size. The very small particles are not easily obtained and generally have low luminosity and are inefficient.

A third prior art approach involves the use of a barrier layer green phosphor mixed with a red phosphor. The barrier layers are formed on ZnS as a host material, so that only broad band green emission is obtained and not the desired line spectral emission. The green phosphor is coated with ZnO or ZnS or CoS is diffused into the surface of the ZnS. The green light produced by this structure is unsaturated and broadband and the colors are not distinct.

While certain rare earth materials have been proposed for use in display devices, the prior art has given only minor attention to rare earth materials for application in penetration phosphor displays. It appears that one approach to the penetration phosphor display area has been made using a rare earth material, but the color at low beam voltages is green and at high voltages, red is obtained. Such a particle cannot be mixed with an additional phosphor, to produce a phosphor which changes in color from red to green with increasing voltages since the first emission color is green. The saturation of the colors is inferior and color control is difficult since the same activator must be used for all light emission.

In Applicant's copending application Ser. No. 505,710, now U.S. Pat. No. 3,939,377 a penetration phosphor of the general type described herein is disclosed. In particular, the penetration phosphor therein consists of a core or central region comprised of a host material of $La_2O_2S$ with a uniform distribution of an activator ion such as terbium (Tb) therethrough. The core or central region is surrounded by a barrier or peripheral region comprised of $La_2O_2S$ with a distribution of co-activator ions therethrough; particularly Tb and Eu. This penetration phosphor yields a red spectral emission at low electron beam excitation voltage and a green spectral emission for high electron voltage excitation with the appropriate colors (orange and yellow) therebetween.

SUMMARY OF THE INVENTION

The present invention comprises two novel penetration phosphors which may be produced in larger quantities than the particle of Ser. No. 505,710 and with the desired barrier or peripheral region thickness. In particular, these penetration phosphors are comprised of a particle $La_2O_2S$:Tb which is carefully oxygen annealed to provide a barrier or peripheral region of $La_2O_2SO_4$:Tb of desired thickness. Additionally, europium ions may be added to form a barrier or peripheral region of $La_2O_2SO_4$:Tb,Eu. The oxysulfate barrier or peripheral region only weakly emits illumination when excited by the electron beam. Moreover, the weak emission emanating therefrom is converted to red spectral emission in the second embodiment of the present invention. Finally, the second embodiment may be hydrogen sulfide annealed to yield the penetration phosphor disclosed in Applicant's copending application Ser. No. 505,710 by a different synthesis than disclosed therein which may be controlled to yield barrier or peripheral region of the desired thickness in larger quantities than previously attainable.

BRIEF DESCRIPTION OF THE DRAWINGS

FIG. 5b is a cross-section view of the reaction chamber shown in FIG. 5a.

DESCRIPTION OF THE PREFERRED EMBODIMENT

Figure 1:
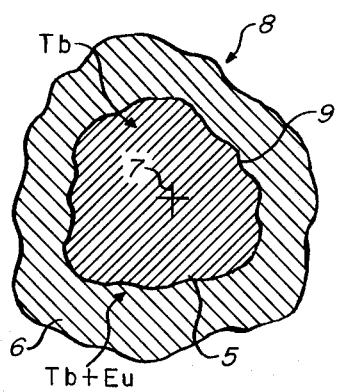
FIG. 1 is a cross-section view of a representative phosphor particle according to the invention.

Referring now to FIG. 1, a cross-section of a cathodoluminescent penetration phosphor particle 8 comprising the present invention is illustrated. In particular, the novel penetration phosphor 8 of the present invention is utilized in particulate form and comprised of a central region 5 surrounded by a peripheral region 6. The central region 5 is comprised substantially of a host material, $La_2O_2S$, with a uniform distribution of an activator therethrough, such as terbium (Tb) ions supplied thereto in the form of $Tb_2O_2S$. Beginning with interface 9, the central region 5 is generally uniformly surrounded by the peripheral region 6 which is comprised substantially of lanthanum oxysulfate ($La_2O_2SO_4$) having a homogeneous distribution of activator ions therethrough in the form of terbium oxysulfate, $Tb_2O_2SO_4$. In an alternative embodiment of the present invention, the peripheral region 6 may also include, for quenching purposes which will be detailed hereinafter, a distribution therethrough of another activator ion such as europium (Eu) present in the form of europium oxysulfate ($Eu_2O_2SO_4$). In either embodiment, the concentrations of the activator ions are substantially smaller than the concentrations of the host ions.

Figure 2:
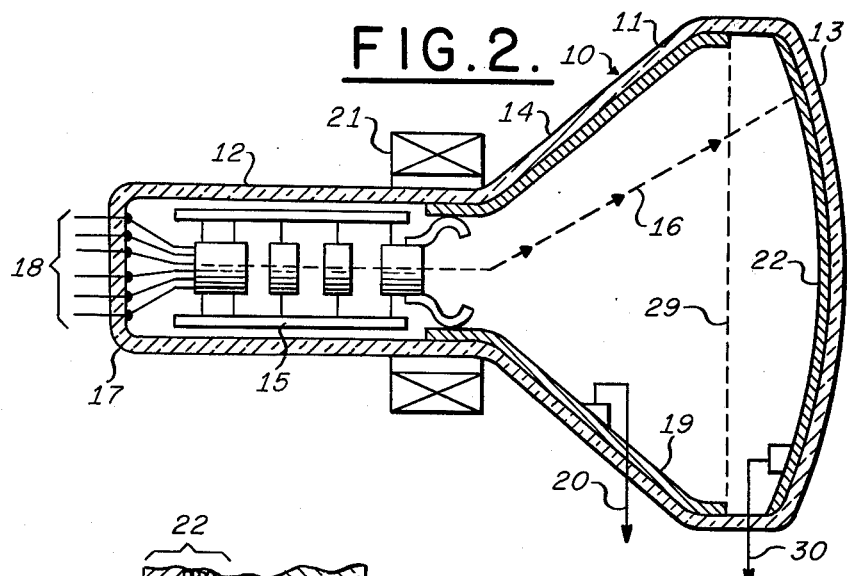
FIG. 2 is a cross-section view of a represented cathode ray vacuum tube display in which the novel phosphor particle may be used.

FIG. 2 illustrates a cathode ray tube in which the invention may be employed. The tube 10 consists of a vacuum envelope 11 including a neck 12, a viewing face plate 13 and a conically shaped transition section 14 for completing the vacuum envelope. An electron gun 15 is supported within the neck 12 and is adapted to project an electron beam represented by the dotted line 16 toward an inner surface of the face plate 13. The neck 12 is closed at its end opposite face plate 13 by a stem structure 17 through which a plurality of lead-in wires 18 are sealed. Suitable operating potentials may be applied to the electron gun 15 and to its associated cathode through the conductors 18. A conducting coating 19 is provided on the internal surface of the conical section 14 of envelope 11 and serves as an accelerating electrode for electron beam 16. A suitable high voltage is applied from a conventional power supply (not shown) to the conducting coating 19 by a terminal sealed through the glass cone 14, as represented at 20. A magnetic deflection yoke 21 or other conventional electron beam deflection means is provided for positioning electron beam 16 with respect to face plate 13.

Figure 3:
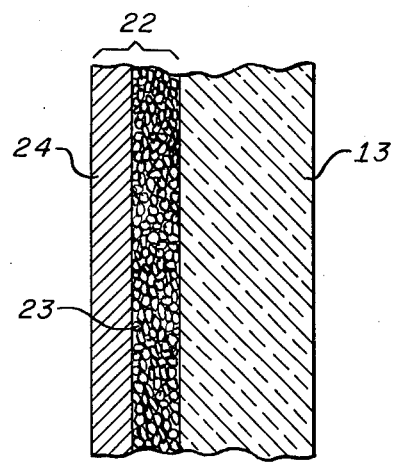
FIG. 3 is a magnified cross-section view of the screen element of FIG. 2.

The screen of the present invention is supported on the face plate 13 so that the deflected electron beam 16 may excite the phosphor particles comprising screen 22 to the luminescent state. FIG. 3 illustrates in greater detail the luminescent screen 22 which is composed in part of a layer 23 of cathodoluminescent penetration phosphor particles homogeneously distributed among other phosphor particles as will be discussed hereinafter. The layer 23 is characterized by including many particles and is substantially free of voids. A light-reflecting metal layer 24 is supported upon layer 23. The metal layer 24 is thin and composed of a metal such as aluminum, so that it may be readily penetrated by the electrons of beam 16. The display tube 10 may be provided with a mesh grid 29 located transversely within conical section 14. If mesh grid 29 is used, it is connected electrically to the conductive coating 19 so that the display tube may operate according to conventional post-acceleration principles. A separate lead-in conductor as represented at 30, may be supplied for providing a suitable electrical potential to metal layer 24, such as post-acceleration potential, whereupon mesh grid 29 may be eliminated entirely.

Operation of the invention may be described with reference to FIGS. 1, 2 and 3. Low velocity and hence, low energy electrons of beam 16, present therein when a relatively low voltage is applied to terminal 20, strike the surfaces of both types of phosphor particles comprising layer 23. The added phosphor particles are preferably commercially available, narrow-bandwidth, red-emitting phosphors such as $YVO_4:EuVO_4$, $Y_2O_3:Eu_2O_3$ or $Y_2O_2S:Eu_2O_2S$. The low velocity electrons, striking both types of phosphor particles will cause a red spectral emission to emanate from the added phosphor particles. On the other hand, very little emission will emanate from the penetration phosphor particles since the electrons have insufficient energy to penetrate the peripheral region 6 (or barrier layer) and the peripheral region 6, because of its crystalline structure, will at best only weakly emit luminescence therefrom. As the acceleration voltage at terminal 20 is increased, electrons in the beam 16 will penetrate the peripheral region 6 or barrier layer and induce a narrow-bandwidth, green, spectral emission from the central region of each penetration phosphor 8. Accordingly, as the acceleration voltage at terminal 20 is increased towards its maximum value, the gradual increase in green emission from the central regions 5 of each penetration phosphor will induce a color change from red to orange to yellow and finally to a substantially green light. The degree of generation of red or green light is therefore controlled by the relative concentration of phosphor particles and by a conventional type of voltage level programmed power supply coupled to terminal 20.

In Applicant's copending application Ser. No. 505,710, the penetration phosphor particle is comprised of a central region substantially identical to that of the present invention and an oxysulfide peripheral region preferably comprised of $La_2O_2S:Tb_2O_2S:Eu_2O_2S$. The oxysulfide peripheral region emits a substantial red, narrow-line spectral luminescence when excited by low energy electrons in electron beam 16. The penetration phosphor of Applicant's copending application utilizes an energy transfer mechanism to substantially eliminate green spectral emission at low electron energy levels wherein energy is transferred from the Tb ions to the Eu ions thereby enhancing the red emission from the peripheral region 6. In other words, the energy from electron beam 16 which would have been emitted as green light by the Tb ions of region 6 is now in part transferred to enhance the red radiation of the Eu ions and is also in part dissipated in the non-radiated electronic transitions. Additionally, other red emitting phosphors such as $YVO_4:EuVO_4$ may be added to the screen to enhance the red spectral emission.

In the present invention, an oxysulfate layer comprises the peripheral region 6 surrounding central region 5 of the penetration phosphor. In contrast, to the prior art, in which the oxysulfide peripheral region has a hexagonal crystal structure, the oxysulfate ($La_2O_2SO_4:Tb$ or $La_2O_2SO_4:Tb,Eu$) peripheral region of the present invention has an orthorhombic crystal structure, which is a poor host lattice and thus characterized by weak emission in the barrier or peripheral region. Thus, the quenching effect (subduing the green emission at low electron energy) is caused by the change in crystal structure in contrast to the energy transfer mechanism utilized in Applicant's copending invention.

The composition of the three penetration phosphors (the penetration phosphors of Ser. No. 505,710 and the two embodiments of the present invention) are illustrated in Table 1. As depicted therein, the composition of each penetration phosphor is divided into an inner core (central region) and a barrier (peripheral region), each of which is subdivided into host lattice and activators. Additionally, the three materials are referred to in Table 1 by the designations of type I, II, and III, respectively. These designations will be utilized throughout the remainder of the specification.

TABLE 1

| TYPE | CORE Host Lattice | Activator | BARRIER Host Lattice | Activator |
|---|---|---|---|---|
| I | $La_2O_2S$ | Tb | $La_2O_2S$ | Tb,Eu |
| II | $La_2O_2S$ | Tb | $La_2O_2SO_4$ | Tb |
| III | $La_2O_2S$ | Tb | $La_2O_2SO_4$ | Tb,Eu |

Referring now to Table 1, the type I particle is characterized by a host lattice of $La_2O_2S$ having a hexagonal crystal structure which is activated by terbium ions (in the form of $Tb_2O_2S$) homogeneously dispersed therethrough. The barrier is co-activated with europium ions (introduced in the form of $Eu_2O_2S$) which quench the emission of the neighboring terbium ions. The decrease in emission from the Tb ions is attributed to two effects. Firstly, the additional Eu ions create a concentration quenching effect, that is, additional ions increase the total concentration of activator ions so that optimum brightness is no longer obtained. More particularly, the brightness of a Tb-doped phosphor is sensitive to the activator concentration therein. Moreover, the effect of co-activation of rare earth lattices has been found to reduce the brightness of a phosphor with respect to a phosphor containing only one activator. The concentration quenching effect may be achieved by the addition of any of several rare earth ions including Tb itself. Europium is chosen for co-activation because the emission from Eu ions is red and is generally more intense than that of other red-emitting rare earth ions. The second effect, is the energy transfer mechanism heretofore described.

The composition of the core of the type II penetration phosphor particles is identical to that of the type I particle. However, the barrier is comprised of lanthanum oxysulfate ($La_2O_2SO_4$) which has an orthorhombic crystal structure. The Tb activator ions present in the form of $Tb_2O_2S$ in the central region and in the form of $Tb_2O_2SO_4$ in the barrier region are homogeneously dispersed throughout the respective regions of the phosphor particle. However, since the host material in the peripheral region is a poor host lattice, the emission therefrom is weak. Accordingly, in contrast to the type I penetration phosphor particle, the quenching effect is caused by the change in crystal structure.

The type III penetration phosphor particle has a core material similar to that of the previous two types of penetration phosphor particles. Similar to the type II penetration phosphor particles, the barrier or penetration region utilizes lanthanum oxysulfate as a host lattice. However, the quenching effect achieved in the type III penetration phosphor particle results from a combination of the effects described for both the type I and type II particles. Specifically, the orthorhombic crystal structure from the barrier or peripheral region will generate only a weak emission and because of the presence of the co-activator, in the form of $Eu_2O_2SO_4$, the emission that does emanate therefrom will be red spectral emission due to the two effects described for the type I penetration phosphor particle.

Similar to the type I penetration phosphor particle, the core material of the type II and type III particles provide intense, green, narrow-bandwidth emission when excited by high energy electrons, whereas low energy electrons do not penetrate to the core. When incorporated with red-emitting phosphors such as $YVO_4$:$EuVO_4$ in layer 23 of an electron tube screen, the resulting mixture emits red luminescence when a relatively low voltage is supplied to terminal 20 followed by orange, yellow and finally green as the voltage thereto is increased. In the type III particle, use is also made of the co-activator quenching effect by the addition of Eu ions in the barrier to further subdue emissions therefrom. Moreover, as will be more fully described, the type II and type III penetration phosphors may be produced with a desired precision in substantially larger quantities than was possible by previous methods utilized to produce the type I penetration phosphor particle. Additionally, this production precision with respect to the type II and III particles may be applied to the type I particle since a type III particle may easily be converted thereto.

Figure 4:
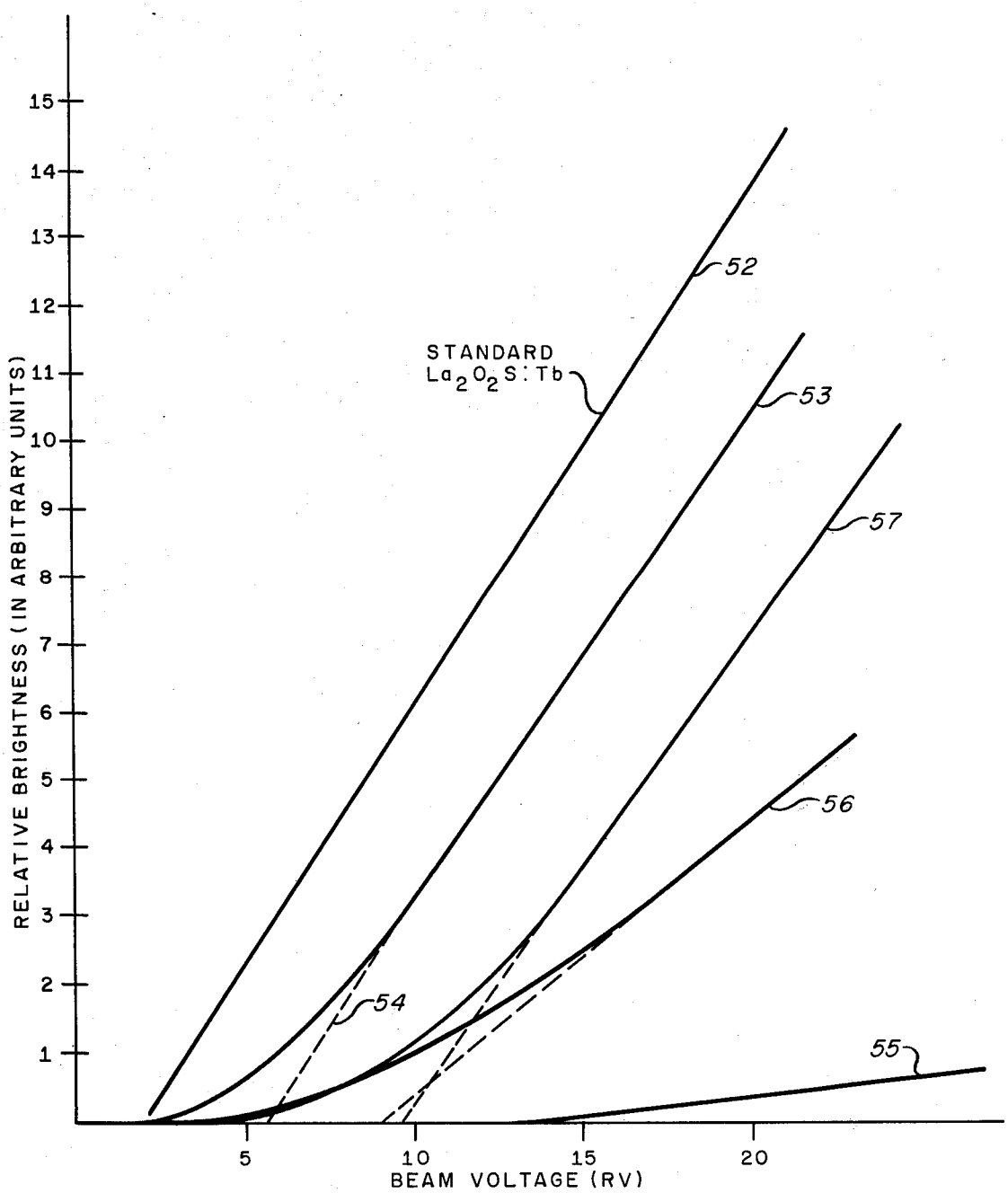
FIG. 4 is a series of graphs useful in explaining the nature of the phosphor particles discussed herein.

Referring now to FIG. 4, a plurality of curves are depicted for illustrating the relative brightness of electron beam excited phosphors, using an arbitrary scale, as a function of the electron beam acceleration voltage. Curve 52 in FIG. 4 is representative of such a plot for a green phosphor, $La_2O_2S$:Tb, which is utilized as a standard of comparison for the penetration phosphors of the present invention. The desired objective of the present invention is to produce a phosphor with a relative brightness curve having a slope generally parallel to that of the curve 52 but with an increased voltage-turn-on characteristic with respect thereto. The higher threshold or voltage-turn-on is required to yield a changing color spectrum in the screen relative to an increasing electron beam voltage utilizing the voltage range of 8 – 18KV. Additionally, the steep slope in the relative brightness curve (substantially parallel to the curve for an untreated phosphor, i.e., curve 52) is required in order to obtain a wide spread in color coordinates with changing voltage in the final mixture of penetration phosphors and regular phosphors.

The introduction of a barrier layer or peripheral region surrounding a central region comprised of an intense, narrow-bandwidth, emitting phosphor will provide a mechanism for yielding a higher threshold or voltage-turn-on characteristic, since the electrons of electron beam 16 must penetrate therethrough in order to induce luminescence in the central region. However, the brightness of the penetration phosphor will decrease as the thickness of the barrier or peripheral region increases. Moreover, irregularities in the uniformity of the thickness of the barrier or peripheral region will induce non-linearity in the brightness vs. voltage curve for the penetration phosphor. Accordingly, it is desirable to control the thickness of the barrier or peripheral region so that a uniform coating is produced with the minimum thickness required to yield the desired threshold or voltage-turn-on characteristic. Since the threshold or turn-on voltage of a typical phosphor is approximately 2KV (see curve 52 in FIG. 4), and since a desirable upper limit on the magnitude of the beam excitation voltage which will yield a complete color spectrum (red to green) is 20 to 25 kilovolts, a desirable range of threshold or turn-on voltages for the penetration phosphor of the present invention is 8 to 10 kilovolts as similarly indicated in Applicant's copending application Ser. No. 505,710.

The present invention, as earlier noted, comprises two novel penetration phosphors (types II and III), the methods for producing the same and, additionally, an improved method for producing the type I penetration phosphor. As indicated above, the problem in the synthesis of the barrier or penetration phosphors, especially with respect to the production of large amounts thereof, is to control the thickness of the barrier or peripheral region to a specified depth (which will be more discussed hereinafter) with a reasonable degree of precision. More specifically, with respect to the type I and type III penetration phosphors, the depth of diffusion of the Eu ions must be controlled whereas, with respect to the type II and type III penetration phosphors, the thickness of the lanthanum oxysulfate peripheral region must be controlled. Both of these problems are related by the fact that europium diffusion in lanthanum oxysulfide is negligible, whereas in lanthanum oxysulfate, it is appreciable. Thus, the formation of the oxysulfate structure is necessary in order to form both a barrier region, with respect to type II and type III, and in order to control the diffusion of europium with respect to type I and type III. Therefore, by controlling, during the formation of the oxysulfate barrier, the amount of oxygen available or the temperature and time of the oxygen anneal, the formation of lanthanum oxysulfate can be limited to yield a barrier or peripheral region in the penetration phosphor having the desired characteristics enumerated above.

In order to obtain an estimate of the maximum thickness of the barrier layer, required for the materials described above, a modified model of turn-on voltage as a function of barrier thickness is utilized. Specifically, a general equation describing electron penetration of solids is given by the relation:

$$d = CV^n. \qquad (1)$$

where $d$ is the depth of penetration, V is the energy of the electrons and C and $n$ are characteristic constants of the material. For zinc sulfide phosphors, the values of C and $n$ in equation (1) have been experimentally determined to be $7.3 \times 10^{-7}$ and 1.77 respectively where V is in kilovolts and $d$ is in centimeters. The coefficient, C was modified for $La_2O_2S$ by correcting for differences therebetween in atomic number, molecular weight and intensity. Equation (1) may, therefore, be rewritten for lanthanum oxysulfide as $$d = (5.77 \times 10^{-3}) (V^{1.77}), \qquad (2)$$

where $d$ is in microns and V is the accelerating potential of the electrons in kilovolts. Accordingly, the thickness of the barrier layer in microns is represented by $d$ when V is the turn-on voltage in kilovolts.

For a desired turn-on voltage, the modified equation predicts the barrier thickness. The predicted value for barrier thickness can be used to calculate the amount of lanthanum oxysulfate that will be necessary. The volume occupied by the barrier or peripheral region is calculated assuming spherical particles although scanning electron micrographs indicate that the particles are irregular polyhedra and only roughly spherical. Moreover, since the density of $La_2O_2SO_4$ (5.5 2 G/CC) is less than that of $La_2O_2S$ (5.73 G/CC) there is probably a slight but insignificant increase in the particle diameter of the type II and type III phosphors with respect to a type I particle. The percentage of the volume of active phosphor material remaining in the core or central region determines the maximum possible brightness which can be obtained from the resulting barrier phosphor. Accordingly, using modified equation (2) and assuming the medium particle diameter of the phosphor is 10 microns, it is calculated that 13 to 19% by volume of each oxysulfide particle must be converted to oxysulfate in order to obtain a barrier phosphor with a turn-on voltage range of 8 to 10 kilovolts. As will be discussed hereinafter, the above prediction is experimentally verified by a number of samples produced by the methods of the present invention.

Before detailing individually the synthesis of each of the penetration phosphors (types I, II and III), it should be noted that during the step of oxygen anneal for each type of penetration phosphor, temperature equilibrium must be maintained over the entire sample and throughout the duration of the step. If temperature equilibrium is not maintained, the rate of formation of $La_2O_2SO_4$ will vary and result in an uneven barrier thickness. This in turn will increase the non-linearity of the brightness versus voltage curve for the sample yielding the undesirable results heretofore detailed.

Figure 5A:
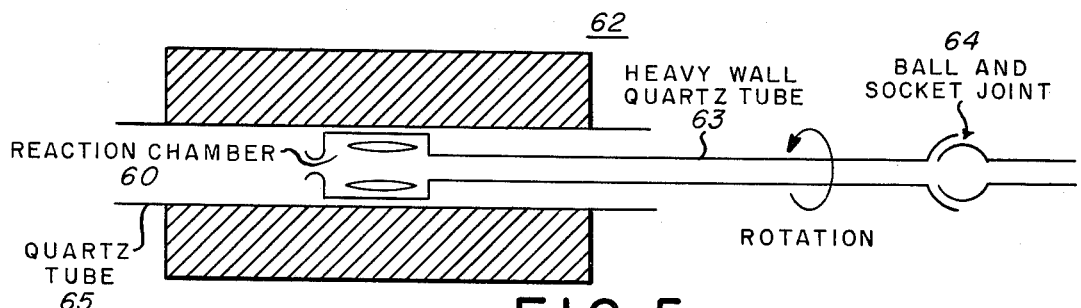
FIG. 5a is a cross-section view of the apparatus used to oxygen anneal the phosphor particles.
Figure 5B:
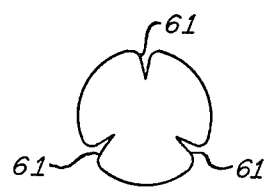

Secondly, the oxygen anneal is most easily carried out in a rotating quartz chamber such as that illustrated in FIG. 5a. This is especially necessary when the quantity of sample becomes so large that it will not be uniformly in contact with oxygen during the annealing. The chamber 60 is provided with indentations 61 therein as depicted in FIG. 5b in order to insure that the material is tumbled during the anneal. The chamber, in keeping with the dictate of the foregoing paragraph, should be kept within a constant temperature zone within the oven 62. The chamber is rotated by means of a heavy walled quartz tube 63 extending therefrom and coupled to a ball and socket joint 64 which is accordingly coupled to rotating means (not shown). Additionally, a controlled atmosphere surrounding the chamber is obtained by the incorporation of a quartz tube 65 extending substantially from each end of the oven 62 and through which the proper gases are passed.

Thirdly, in the synthesis of both the type I and type III penetration phosphors, europium-tris-2,2,6,6-tetramethylheptanedionate is utilized to provide europium or diffusion in the barrier or peripheral region. Although many other europium-containing compounds will produce adequate results, some of these materials will induce undesired side reactions. For example, use of europium trichloride may induce a reaction with the phosphor producing lanthanum oxychloride. Therefore, satisfactory results are the most easily obtained with organic chelates containing only carbon hydrogen and oxygen in addition to the rare earth ion. For example, another suitable chelate can be made with penetanedione (acetyl acetone) and europium.

EXAMPLE A

A sample of a novel type II penetration phosphor ($La_2O_2S:Tb - La_2O_2SO_4:Tb$) may be produced in the following manner. A 10g sample of lanthanum oxysulfide with terbium oxysulfide dispersed therethrough ($La_2O_2S:Tb_2O_2S$) is oxygen annealed in the rotating quartz chamber of FIG. 5. Specifically, the material is kept in an atmosphere of inert gas, such as argon, until the anneal temperature of 750° C is reached. The material is then annealed for 25 minutes at a temperature of 750° C and thereafter air quenched. X-ray analysis of samples from this process indicates approximately 9 mole % of the volume of the particles is $La_2O_2SO_4$ where the mole % is defined as the percentage of the ratio of moles of $La_2O_2SO_4$ to the total moles of $La_2O_2SO_4$ and $La_2O_2S$. Additionally, these samples has a turn-on voltage of 6.2 kilovolts.

EXAMPLE B

A sample of a type III penetration phosphor ($La_2O_2S:Tb-La_2O_2SO_4:Tb,Eu$) may be prepared by combining 10g of $La_2O_2S:Tb$ ($2.9 \times 10^{-2}$ moles) with 400 mg of europium-tris-2,2,6,6-tetramethylheptanedionate ($5.7 \times 10^{-4}$ mole). The mixture is tumbled in a polyethylene bottle for approximately 16 hours. The mixture is then oxygen annealed for 30 minutes at 725° C and thereafter air quenched. X-ray analysis of samples produced by the process indicates that $La_2O_2SO_4$ comprised approximately 12 mole % of the particles and the samples had a turn-on voltage of approximately 7 kilovolts.

EXAMPLE C

As earlier noted, the present invention includes an improved method of producing a type I ($La_2O_2S:Tb-La_2O_2S:Tb,Eu$) penetration phosphor. A sample thereof may be produced by combining 20G of $La_2O_2S:Tb$ ($5.85 \times 10^{-2}$ moles) with 405mg of europium-tris-2,2,6,6-tetramethylheptanedionate ($5.7 \times 10^{-4}$ moles). The chelate is pre-sieved through a 53 micron mesh before combination with the host material ($La_2O_2S:Tb$). The mixture is thereafter tumbled in a polyethylene bottle for approximately 16 hours. Thereafter, the mixture is fired in the quartz reaction chamber 60 within the horizontal tube 65 in furnace 62. An atmosphere of inert gas, such as argon, is circulated through tube 65 until a temperature of 750° C is reached. At this point, the inert gas is replaced by oxygen and the chamber is rotated for 20 minutes. Thereafter, the material is fired in the furnace in an atmosphere comprising approximately 70% inert gas and 30% hydrogen sulfide bubbled through water at 25° C for a period of approximately 6 hours at a maximum temperature of 1,000° C. The product is then cooled in an atmosphere of argon.

X-ray analysis of samples produced by this method indicates a final product of 100% $La_2O_2S$ with a voltage turn-on characteristic of 8.5 kilovolts.

EXAMPLE D

As previously noted, the europium diffusion in lanthanum oxysulfide is negligible whereas europium diffusion in lanthanum oxysulfate is appreciable. The following synthesis illustrates this point. 40 grams of $La_2O_2S:Tb$ ($1.7 \times 10^{-1}$ mole) is added to 400mg of europium-tris-2,2,6,6-tetramethylheptanedionate ($5.7 \times 10^{-4}$ mole). The mixture, which has a Eu to host ratio of $4.86 \times 10^{-3}$ moles, is tumbled for 16 hours in a 4 ounce polyethylene bottle with 6 glass beads. The material is then fired for two hours at 1,050° C in an atmosphere of hydrogen sulfide ($H_2S$), water and argon. The material is thereafter cooled under dry argon. Seven more cycles are performed by adding 400mg of the europium chelate, tumbling and refiring under similar conditions. After the eighth cycle, the cathode ray response of a sample of the material is determined. The response of samples from this process are depicted in curve 53 of FIG. 4 which indicates a turn-on voltage of 5.5 kilovolts.

It should be noted at this point, that the turn-on voltage for this sample, as well as all of the penetration phosphors described in this application, is defined as the point where the straight line extension of the substantially linear portion of the brightness vs. voltage curve intercepts the voltage axis. With respect to curve 53 in FIG. 4, the turnon voltage is represented by intersection of the dotted line extension from the substantially linear portion of curve 53 with the voltage axis.

A sample of the above material (as represented by curve 53 in FIG. 4) is then oxygen annealed at the temperature in the range of 780 to 980° C for a period of 3 hours to form $La_2O_2SO_4$:Tb,Eu, thereby permitting europium diffusion to occur. The cathode ray response of the material is thereafter measured, and as expected, a high turn-on voltage characteristic is achieved and the emission response of the material is poor as indicated in curve 55 of FIG. 4. The poor emission response is expected because of the lengthy duration of the oxygen annealing step and the fact that the oxygen supplied during the anneal is not limited. Accordingly, a substantial portion of the particle was converted to lanthanum oxysulfate as opposed to the thin barrier required for the type II and type III penetration phosphors.

Thereafter, the $La_2O_2SO_4$:Tb,Eu is hydrogen sulfide annealed for 5 hours at 975° C and cooled in an atmosphere of dry argon. As a result, the material is converted to an oxysulfide structure as evidenced by the improved cathode ray response indicated in curve 56 of FIG. 4. Moreover, the improved turn-on voltage of 9 kilovolts with respect to that in curve 53 in FIG. 4, indicates that substantial europium diffusion occurs when the particle is converted to an oxysulfate structure.

EXAMPLE E

Another sample may be prepared illustrating that the host material ($La_2O_2S$:Tb) may be coated with europium and converted to an oxysulfate in one step. Accordingly, 10G of $La_2O_2S$:Tb (2.93 × $10^{-2}$ mole) is added to 200mg of europium-tris-2,2,6,6-tetramethylheptanedionate (2.85 × $10^{-4}$ mole) producing a mixture with a europium to host ratio of .01 (in moles). The mixture is tumbled with a teflon bar in a polyethylene bottle for 23 hours and then annealed in oxygen for 30 minutes at a temperature of 760 to 780° C. The material is thereafter annealed in an atmosphere of hydrogen sulfide for 7 hours at approximately 1,000° C and cooled in an atmosphere of dry argon. The cathode ray response of samples of the resulting penetration phosphor from this synthesis is illustrated in curve 57 of FIG. 4.

Referring now to Table 2 (below), the characteristics of several more samples of type II and type III penetration phosphors are listed. In Table 2, the first two columns indicate generally the critical synthesis conditions (the oxygen anneal time and the oxygen anneal temperature) while the latter two columns indicate the pertinent characteristics of the resultant particle (the mole percentage of lanthanum oxysulfate and the turn-on voltage).

TABLE 2

OXYGEN ANNEAL CONDITIONS FOR BARRIER LAYER FORMATION

| Oxygen Anneal Time (minutes) | Oxygen Anneal Temperature (° C) | Mole % $La_2O_2SO_4$ (≈) | Turn-on Voltage (kilovolts) |
|---|---|---|---|
| 30 | 750 | 22 | 10.5 |
| 60 | 780 | 20 | 9 |
| 30 | 770 | 20 | 9 |
| 30 | 750 | 20 | 8.5 |
| 25 | 740–60 | 19 | 7.5 |
| 30 | 747 | 17.5 | 9.5 |
| 80 | 778 | 17 | 8 |
| 30 | 750–65 | 15 | 9 |
| 60 | 725 | 13 | 8.5 |
| 42 | 750 | 13 | 7 |
| 30 | 725–45 | 13 | 6.2 |
| 30 | 725–35 | 11 | 7.5 |
| 25 | 750 | 9 | 6.2 |
| 30 | 750 | 8 | 5.5 |
| 30 | 725 | 7 | 3.5 |

Figure 6:
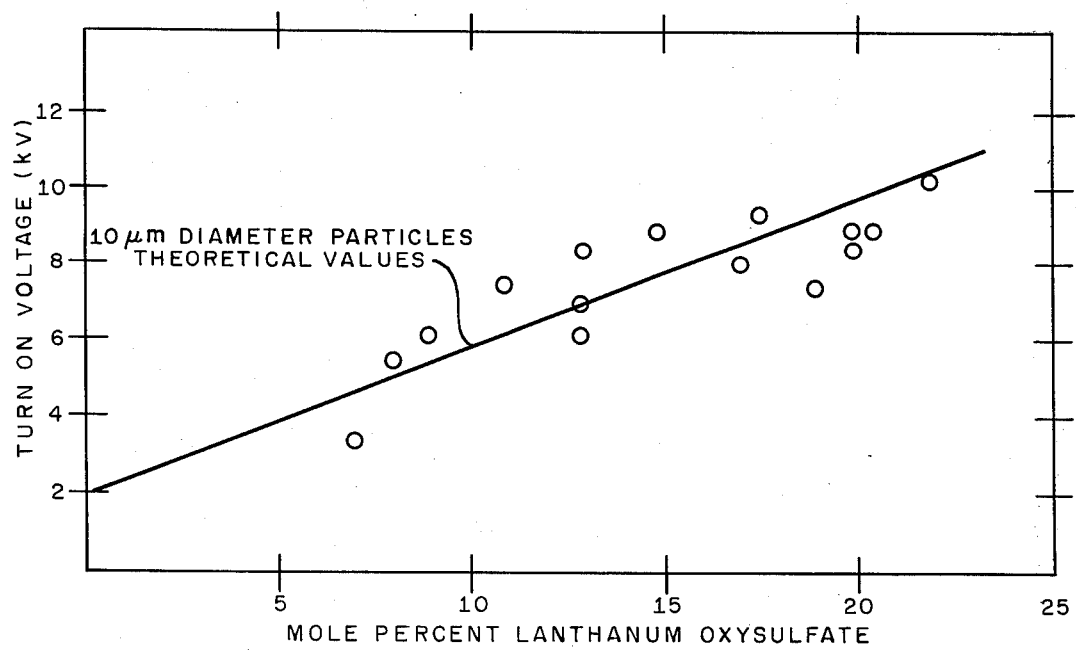
FIG. 6 is a graph in which the turn-on voltage characteristic of the various samples of penetration phosphors disclosed herein are plotted with respect to an estimated value therefor.

In each case, the samples were kept under argon until the anneal temperature was reached and while cooling to room temperature. Since different furnaces and controllers were used, the accuracy of the temperature reading may vary. The mole percent lanthanum oxysulfate was determined from X-ray diffraction intensities. The resultant characteristics (turn-on voltage versus mole percent lanthanum oxysulfate) of the samples listed in Table 2 are plotted in FIG. 6. FIG. 6 also contains a solid line indicating the expected results based on the computations developed for equation (2). As can be appreciated from FIG. 6, equation (2) provides a satisfactory guideline for determining the thickness of the peripheral region which is required to yield a desired voltage turn-on characteristic.

The penetration phosphors (type II and type III) prepared by the methods indicated herein, as previously indicated are combined in an electron tube screen with a commercial red-emitting phosphor. As an illustration thereof, the results of two examples are detailed below in Table 3. In these two examples $YVO_4EuVO_4$ is employed as the commercial red phosphor, representing approximately 15% by weight of the total mixture. The results indicated below are standard coordinate values conventionally used for numeral description of colors as in Kelly charts or C.I.E. chromaticity diagrams (referred to *Color Science* by Wyzecki and Stiles, John Wiley, 1967). Additionally, the efficiency in lumens per watt is listed.

TABLE 3

COLOR CO-ORDINATES OF PENETRATION PHOSPHORS

SAMPLE 1
Type II $La_2O_2S$:Tb-$La_2O_2SO_4$:Tb with $YVO_4$:Eu

| Beam Voltage (kilovolts) | X | Y | Lumens/Watt |
|---|---|---|---|
| 5 | .587 | .395 | 2.0 |
| 7 | .574 | .405 | 2.1 |
| 10 | .538 | .435 | 3.4 |
| 14 | .489 | .479 | 5.4 |
| 18 | .461 | .501 | 7.6 |

SAMPLE 2
Type III $La_2O_2S$:Tb-$La_2O_2SO_4$:Tb,Eu with $YVO_4$:Eu

| Beam Voltage (kilovolts) | X | Y | Lumens/Watt |
|---|---|---|---|
| 5 | .568 | .413 | 4.3 |
| 12.5 | .514 | .460 | 7.0 |
| 18 | .470 | .494 | 9.6 |

From the foregoing, it can be appreciated that the present invention comprises two novel penetration phosphor particles and the methods for producing the same in addition to an improved method for producing the penetration phosphor particle described in Applicant's copending application Ser. No. 505,710. The novel penetration phosphors and the methods for producing the same detailed herein provide an economical and reliable method for producing these desired penetration phosphors in large quantities. More particularly, one of the novel penetration phosphors (type II) is produced by forming a thin (sub-micron) layer of $La_2O_2SO_4$ surrounding the central region of green, narrow bandwidth emitting $La_2O_2S$ with $Tb_2O_2S$ distributed therethrough. Additionally, the second novel penetration phosphor particle (type III) may be produced by duffusing a quenching rare earth ion, such as europium, into the oxysulfate peripheral region of the type II element described above. Finally, the type III phosphor may be annealed in an atmosphere containing $H_2S$ and water vapor yielding a type I penetration phosphor (as described in Applicant's copending application); but which may be produced with precision in large amounts.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A method for making a cathodo-luminescent particle having a central region consisting of $La_2O_2S$ with $Tb_2O_2S$ uniformly distributed therethrough and a peripheral region of $La_2O_2SO_4$ with a distribution of $Tb_2O_2SO_4$ therethrough comprising:

selecting a host material consisting of $La_2O_2S$ particles with a uniform distribution of $Tb_2O_2S$ therethrough, annealing said host material with oxygen for at least 25 minutes at a temperature in excess of 700° C, and air cooling said material.

2. The method as set forth in claim 1 wherein the step of annealing said host material further includes the step of rotating said host material in a rotating quartz chamber for producing a generally uniform thickness throughout the peripheral region of the particle.

3. The method as set forth in claim 2 further including the step of controlling the thickness of the peripheral region of said particle by limiting the amount of oxygen supplied during the step of annealing.

4. The method as set forth in claim 2 further including the step of controlling the thickness of the peripheral region of said particle by regulating the time duration of the step of annealing and the temperature utilized therein.

5. A method for producing a cathodo-luminescent particle having a central region consisting of $La_2O_2S$ with $Tb_2O_2S$ uniformly distributed therethrough and a peripheral region of $La_2O_2SO_4$ with a distribution of $Tb_2O_2SO_4$ and $Eu_2O_2SO_4$ therethrough comprising:

selecting a host material of $La_2O_2S$ particles with a uniform distribution of $Tb_2O_2S$ therethrough, combining said host material with an organic Eu compound, annealing the mixture of the organic Eu compound and the host material with oxygen for at least 25 minutes at a temperature in excess of 700° C, and air cooling said mixture.

6. The method as set forth in claim 5 wherein the step of annealing further includes the step of rotating said mixture in a rotating quartz chamber for producing a generally uniform thickness throughout the peripheral region of said particle.

7. The method as set forth in claim 6 further including the step of controlling the thickness of the peripheral region of said particles by limiting the amount of oxygen supplied during the step of annealing.

8. The method of claim 6 further incuding the step of controlling the thickness of the peripheral region of said particle by regulating the duration of the step of annealing and temperature utilized therein.

9. The method as set forth in claim 5 wherein the organic compound of Eu is selected from the group comprising Eu-tris-2,2,6,6-tetramethylheptanedionate and Eu-pentanedione.

10. The method of producing a penetration phosphor particle for use in an electron tube and having a central region of $La_2O_2S$ with a substantially smaller concentration of $Tb_2O_2S$ uniformly distributed therethrough and a pheripheral region surrounding said central region comprised on $La_2O_2S$ with substantially smaller concentrations of $Tb_2O_2S$ and $Eu_2O_2S$ distributed therethrough comprising:

selecting a host material of $La_2O_2S$ particles having a uniform distribution of $Tb_2O_2S$ therethrough, combining said host material with an organic Eu compound, annealing of the mixture of the host material and the organic Eu compound with oxygen for a period in excess of 20 minutes and at a temperature in excess of 700° C, firing the product from the preceding step in a furnace in an atmosphere comprising $H_2S$ and an inert gas bubbled through $H_2O$, and cooling the product in an atmosphere of an inert gas.

11. The method as set forth in claim 10 wherein the step of annealing further includes the step of rotating the mixture in a rotating quartz chamber for producing a generally uniform thickness throughout the peripheral region of the particle.

12. The method as set forth in claim 11 further including the step of controlling the thickness of the peripheral region of said particles by limiting the amount of oxygen supplied during the step of annealing.

13. The method of claim 11 further including the step of controlling the thickness of the peripheral region of said particles by regulating the duration of the annealing step and temperature utilized therein.

14. The method as described in claim 10 wherein the organic Eu compound is selected from the group comprising Eu-tris-2,2,6,6-tetramethylheptanedionate and Eu pentanedione.

* * * * *